(12) United States Patent
Waniuk

(10) Patent No.: US 10,107,550 B2
(45) Date of Patent: Oct. 23, 2018

(54) CRUCIBLE MATERIALS

(75) Inventor: Theodore A. Waniuk, Lake Forest, CA (US)

(73) Assignee: CRUCIBLE INTELLECTUAL PROPERTY, LLC., Rancho Santa Margarita, CA (US)

( * ) Notice: Subject to any disclaimer, the term of this patent is extended or adjusted under 35 U.S.C. 154(b) by 1078 days.

(21) Appl. No.: 14/237,089

(22) PCT Filed: Aug. 5, 2011

(86) PCT No.: PCT/US2011/046710
§ 371 (c)(1),
(2), (4) Date: Apr. 1, 2014

(87) PCT Pub. No.: WO2013/022417
PCT Pub. Date: Feb. 14, 2013

(65) Prior Publication Data
US 2014/0202597 A1 Jul. 24, 2014

(51) Int. Cl.
| | |
|---|---|
| F27B 14/06 | (2006.01) |
| C04B 35/01 | (2006.01) |
| C04B 35/505 | (2006.01) |
| C04B 35/56 | (2006.01) |
| C04B 35/58 | (2006.01) |
| C04B 35/597 | (2006.01) |
| F27B 14/10 | (2006.01) |
| F27D 1/00 | (2006.01) |
| F27D 5/00 | (2006.01) |
| C04B 41/87 | (2006.01) |
| C04B 41/00 | (2006.01) |
| C04B 41/50 | (2006.01) |
| F27B 14/14 | (2006.01) |
| C04B 111/00 | (2006.01) |

(52) U.S. Cl.
CPC .......... *F27B 14/061* (2013.01); *C04B 35/01* (2013.01); *C04B 35/505* (2013.01); *C04B 35/56* (2013.01); *C04B 35/58* (2013.01); *C04B 35/597* (2013.01); *C04B 41/009* (2013.01); *C04B 41/5042* (2013.01); *C04B 41/87* (2013.01); *F27B 14/10* (2013.01); *F27B 14/14* (2013.01); *F27D 1/0006* (2013.01); *F27D 5/0068* (2013.01); *C04B 2111/0087* (2013.01); *F27B 2014/104* (2013.01); *F27D 2005/0081* (2013.01)

(58) Field of Classification Search
CPC .......... F27B 14/00; F27B 14/10; F27B 14/14; F27B 14/061; C04B 35/00; C04B 35/01; C04B 35/505; C04B 35/56; C04B 35/58; C04B 35/597; C04B 41/00; C04B 41/87; F27D 1/0006; F27D 5/0068
See application file for complete search history.

(56) References Cited

U.S. PATENT DOCUMENTS

| | | | |
|---|---|---|---|
| 3,180,632 A | 4/1965 | Katz et al. | |
| 3,242,015 A * | 3/1966 | Harris | C30B 11/003 117/223 |
| 3,401,227 A | 9/1968 | Jayaraman et al. | |
| 4,550,412 A * | 10/1985 | Holcombe | F27B 14/061 219/634 |
| 5,288,344 A | 2/1994 | Peker et al. | |
| 5,368,659 A | 11/1994 | Peker et al. | |
| 5,416,795 A | 5/1995 | Kaniuk et al. | |
| 5,618,359 A | 4/1997 | Lin et al. | |
| 5,735,975 A | 4/1998 | Lin et al. | |
| 6,325,868 B1 | 12/2001 | Kim et al. | |
| 6,861,629 B2 * | 3/2005 | Dahake | H05B 6/26 219/624 |
| 7,132,077 B2 * | 11/2006 | Norville | C22C 1/005 266/236 |
| 8,480,864 B2 | 7/2013 | Farmer et al. | |
| 8,980,004 B2 | 3/2015 | Sato et al. | |

FOREIGN PATENT DOCUMENTS

| | | |
|---|---|---|
| CN | 101381242 | 3/2009 |
| EP | 1365201 | 11/2003 |
| GB | 2165628 | 4/1986 |
| JP | S56-134059 | 10/1981 |
| JP | S62153189 | 7/1987 |
| JP | 225891 | 8/1989 |
| JP | 03-013566 | 1/1991 |
| JP | 03-037181 | 2/1991 |
| JP | 03-064454 | 3/1991 |
| JP | 06-032692 | 2/1994 |
| JP | H07-041918 | 10/1995 |
| JP | H09143687 | 6/1997 |
| JP | 09-249494 | 9/1997 |
| JP | H11116398 | 4/1999 |
| JP | 200176610 | 6/2000 |
| JP | 2001303218 | 10/2001 |
| JP | 2002090069 | 3/2002 |
| JP | 2003306706 | 10/2003 |

(Continued)

OTHER PUBLICATIONS

Kaye & Laby National Physical Laboratory 2.3.7 Thermal conductivities. Accessed May 30, 2017. http://www.kayelaby.npl.co.uk/general_physics/2_3/2_3_7.html.*

(Continued)

*Primary Examiner* — Jennifer A Smith
*Assistant Examiner* — Alexandra M Moore
(74) *Attorney, Agent, or Firm* — Foley & Lardner LLP

(57) ABSTRACT

One embodiment provides an article, comprising: an inner container having a cavity, the inner container comprising a ceramic; and an outer container, the outer container comprising a susceptor; wherein at least a portion of an outer surface of the inner container is in contact with an inner surface of the outer container, and wherein the inner container is removable from the mold. Methods of melting using the present article are also provided.

12 Claims, 7 Drawing Sheets

(56) References Cited

FOREIGN PATENT DOCUMENTS

| JP | 2003343979 | 12/2003 |
| JP | 2004244670 | 9/2004 |
| JP | 2009132587 | 6/2009 |
| JP | 2010-38697 | 2/2010 |
| JP | 2010037114 | 2/2010 |
| JP | 2010275181 | 12/2010 |
| JP | 2011088776 | 5/2011 |

OTHER PUBLICATIONS

Inoue et al., Bulk amorphous alloys with high mechanical strength and good soft magnetic properties in Fe-TM-B (TM=IV-VIII group transition metal) system, *Appl. Phys. Lett.*, 71 (4), 1977, pp. 464-466.

Shen et al., Bulk Glassy $Co_{43}Fe_{20}Ta_{5.5}B_{31.5}$ Alloy with High Glass-Forming Ability and Good Soft Magnetic *Properties, Materials Transactions*, vol. 42, No. 10, 2001, pp. 2136-2139.

Japanese Patent Application No. 2014-524985, Notice of Reasons for Rejection Office Communication, dated Aug. 26, 2014.

Japanese Patent Office, Japanese Patent Application No. JP 2014-523894, Notice of Reasons for Rejection Office Communication, dated Jul. 29, 2014.

H. Y. Bai et al., Electrical resistivity in Zr 48 Nb 8 Cu 12 Fe 8 Be 24 glassy and crystallized alloys, Journal of Applied Physics, vol. 95, No. 3, Feb. 1, 2004, pp. 1269-1273.

Yoshihiro Takahara et al., Structural Relaxation and Crystallization of Amorphous $Fe_{79}B_{16}Si_5$, J. Japan Inst. Metals, 1987, vol. 51, No. 2, pp. 95-101.

Yokoyama T. et al., Heterogeneous silicon crystal growth on a single crystal silicon wafer by a molten silicon spraying deposition method, Journal of Crystal Growth, vol. 99, No. 1-4, Jan. 1, 1990, pp. 235-239.

Katayama t. et al., "Single crystal preparation of rare earth-cobalt intermedallic compounds by a BN-coated crucible", Journal of Crystal Growth, vol. 24-25, Oct. 1, 1974, pp. 396-399.

M. R. Kargahi et al., "Analysis of failure of conducting crucible used in induction metal melting", Elektrowarme International, vol. 46, Aug. 4, 1988, pp. B189-B200.

International Search Report and Written Opinion, dated Feb. 15, 2012, PCT/ISA/210, PCT/ISA/220, PCT/ISA/237, total of 13 pages.

\* cited by examiner (a)

(b)

CRUCIBLE MATERIALS

All publications, patents, and patent applications cited in this Specification are hereby incorporated by reference in their entirety.

RELATED APPLICATION

This application is related to U.S. application titled "CRUCIBLE MATERIALS FOR ALLOY MELTING" to the same inventor Theodore Andrew Waniuk filed on the same day on Aug. 5, 2011, with Ser. No. 13/198,906.

BACKGROUND

Compared to cold hearth melting techniques, vacuum induction melting (VIM) is relatively inexpensive and capable of a high production rate. However, if VIM is the chosen method for amorphous alloy production, there is a need for an effective means of producing clean alloy feedstock (i.e. low oxygen, carbon, nitrogen, other metallic impurities). Currently, graphite is the most common crucible material used to contain melts of Zr-based amorphous alloys. Melts produced in this type of crucible typically contain elevated levels of carbon, especially after repeated recycling due to diffusion of carbon atoms from the graphite-containing crucible into the melts. Similarly, zirconia and alumina both react significantly with most Zr-based BMG compositions and thus crucible containing these materials can often have undesirable results. Thus, contamination remains a challenge.

Thus a need exists to develop a crucible that can be used in VIM and can minimize the contamination of the alloys by the elements of the crucible material.

SUMMARY

One embodiment provides an article, comprising: an inner container having a cavity, the inner container comprising a ceramic; and an outer container, the outer container comprising a susceptor; wherein at least a portion of an outer surface of the inner container is in contact with an inner surface of the outer container, and wherein the inner container is removable from the mold. Methods of melting using the present article are also provided.

An alternative embodiment provides a method of melting, comprising: providing a mixture of alloy elements; and heating the mixture in an article to a temperature above a melting temperature of the alloy elements, wherein the article comprises: an inner container having a cavity containing the feedstock, the inner container comprising a ceramic; and an outer container, the outer container comprising a susceptor; wherein at least a portion of an outer surface of the inner container is in contact with an inner surface of the outer container, and wherein the inner container is removable from the article.

BRIEF DESCRIPTION OF THE DRAWINGS

FIG. 4(b) is a close-up version of FIG. 4(a).

FIG. 7(c), show that the alloy ingot collapsed into the yttria crucible as a result of melting.

DETAILED DESCRIPTION

Phase

Figure 1:
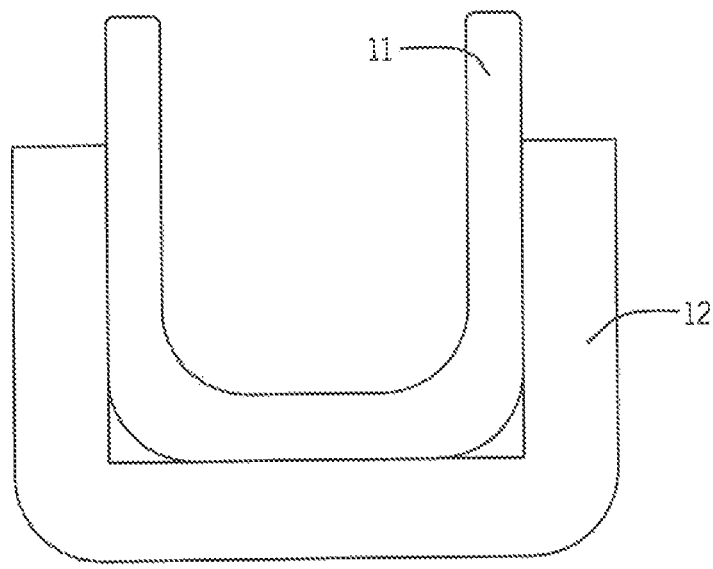
FIG. 1 provides a schematic illustration of a crucible design in one embodiment.

The term "phase" herein can refer to one that can be found in a thermodynamic phase diagram. A phase is a region of space (e.g., a thermodynamic system) throughout which all physical properties of a material are essentially uniform. Examples of physical properties include density, index of refraction, chemical composition and lattice periodicity. A simple description of a phase is a region of material that is chemically uniform, physically distinct, and/or mechanically separable. For example, in a system consisting of ice and water in a glass jar, the ice cubes are one phase, the water is a second phase, and the humid air over the water is a third phase. The glass of the jar is another separate phase. A phase can refer to a solid solution, which can be a binary, tertiary, quaternary, or more, solution, or a compound, such as an intermetallic compound. As another example, an amorphous phase is distinct from a crystalline phase.

Metal, Transition Metal, and Non-Metal

The term "metal" refers to an electropositive chemical element. The term "element" in this Specification refers generally to an element that can be found in a Periodic Table. Physically, a metal atom in the ground state contains a partially filled band with an empty state close to an occupied state. The term "transition metal" is any of the metallic elements within Groups 3 to 12 in the Periodic Table that have an incomplete inner electron shell and that serve as transitional links between the most and the least electropositive in a series of elements. Transition metals are characterized by multiple valences, colored compounds, and the ability to form stable complex ions. The term "nonmetal"

refers to a chemical element that does not have the capacity to lose electrons and form a positive ion.

Depending on the application, any suitable nonmetal elements, or their combinations, can be used. The alloy (or "alloy composition") can comprise multiple nonmetal elements, such as at least two, at least three, at least four, or more, nonmetal elements. A nonmetal element can be any element that is found in Groups 13-17 in the Periodic Table. For example, a nonmetal element can be any one of F, Cl, Br, I, At, 0, S, Se, Te, Po, N, P, As, Sb, Bi, C, Si, Ge, Sn, Pb, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can comprise a boride, a carbide, or both.

A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, and ununbium. In one embodiment, a BMG containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used. The alloy composition can comprise multiple transitional metal elements, such as at least two, at least three, at least four, or more, transitional metal elements.

The presently described alloy or alloy "sample" or "specimen" alloy can have any shape or size. For example, the alloy can have a shape of a particulate, which can have a shape such as spherical, ellipsoid, wire-like, rod-like, sheet-like, flake-like, or an irregular shape. The particulate can have any size. For example, it can have an average diameter of between about 1 micron and about 100 microns, such as between about 5 microns and about 80 microns, such as between about 10 microns and about 60 microns, such as between about 15 microns and about 50 microns, such as between about 15 microns and about 45 microns, such as between about 20 microns and about 40 microns, such as between about 25 microns and about 35 microns. For example, in one embodiment, the average diameter of the particulate is between about 25 microns and about 44 microns. In some embodiments, smaller particulates, such as those in the nanometer range, or larger particulates, such as those bigger than 100 microns, can be used.

The alloy sample or specimen can also be of a much larger dimension. For example, it can be a bulk structural component, such as an ingot, housing/casing of an electronic device or even a portion of a structural component that has dimensions in the millimeter, centimeter, or meter range.

Solid Solution

The term "solid solution" refers to a solid form of a solution. The term "solution" refers to a mixture of two or more substances, which may be solids, liquids, gases, or a combination of these. The mixture can be homogeneous or heterogeneous. The term "mixture" is a composition of two or more substances that are combined with each other and are generally capable of being separated. Generally, the two or more substances are not chemically combined with each other.

Alloy

In some embodiments, the alloy powder composition described herein can be fully alloyed. In one embodiment, an "alloy" refers to a homogeneous mixture or solid solution of two or more metals, the atoms of one replacing or occupying interstitial positions between the atoms of the other; for example, brass is an alloy of zinc and copper. An alloy, in contrast to a composite, can refer to a partial or complete solid solution of one or more elements in a metal matrix, such as one or more compounds in a metallic matrix. The term alloy herein can refer to both a complete solid solution alloy that can give single solid phase microstructure and a partial solution that can give two or more phases. An alloy composition described herein can refer to one comprising an alloy or one comprising an alloy-containing composite.

Thus, a fully alloyed alloy can have a homogenous distribution of the constituents, be it a solid solution phase, a compound phase, or both. The term "fully alloyed" used herein can account for minor variations within the error tolerance. For example, it can refer to at least 90% alloyed, such as at least 95% alloyed, such as at least 99% alloyed, such as at least 99.5% alloyed, such as at least 99.9% alloyed. The percentage herein can refer to either volume percent or weight percentage, depending on the context. These percentages can be balanced by impurities, which can be in terms of composition or phases that are not a part of the alloy.

Amorphous or Non-Crystalline Solid

An "amorphous" or "non-crystalline solid" is a solid that lacks lattice periodicity, which is characteristic of a crystal. As used herein, an "amorphous solid" includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

The terms "order" and "disorder" designate the presence or absence of some symmetry or correlation in a many-particle system. The terms "long-range order" and "short-range order" distinguish order in materials based on length scales.

The strictest form of order in a solid is lattice periodicity: a certain pattern (the arrangement of atoms in a unit cell) is repeated again and again to form a translationally invariant tiling of space. This is the defining property of a crystal. Possible symmetries have been classified in 14 Bravais lattices and 230 space groups.

Lattice periodicity implies long-range order. If only one unit cell is known, then by virtue of the translational symmetry it is possible to accurately predict all atomic positions at arbitrary distances. The converse is generally true, except, for example, in quasi-crystals that have perfectly deterministic tilings but do not possess lattice periodicity.

Long-range order characterizes physical systems in which remote portions of the same sample exhibit correlated behavior. This can be expressed as a correlation function, namely the spin-spin correlation function: $G(x,x')=\langle s(x),s(x')\rangle$.

In the above function, s is the spin quantum number and x is the distance function within the particular system. This function is equal to unity when $x=x'$ and decreases as the distance $|x-x'|$ increases. Typically, it decays exponentially to zero at large distances, and the system is considered to be disordered. If, however, the correlation function decays to a constant value at large |x−x'|, then the system can be said to possess long-range order. If it decays to zero as a power of the distance, then it can be called quasi-long-range order. Note that what constitutes a large value of |x−x'| is relative.

A system can be said to present quenched disorder when some parameters defining its behavior are random variables that do not evolve with time (i.e., they are quenched or frozen)—e.g., spin glasses. It is opposite to annealed disorder, where the random variables are allowed to evolve themselves. Embodiments herein include systems comprising quenched disorder.

The alloy described herein can be crystalline, partially crystalline, amorphous, or substantially amorphous. For example, the alloy sample/specimen can include at least some crystallinity, with grains/crystals having sizes in the nanometer and/or micrometer ranges. Alternatively, the alloy can be substantially amorphous, such as fully amorphous. In one embodiment, the alloy powder composition is at least substantially not amorphous, such as being substantially crystalline, such as being entirely crystalline.

In one embodiment, the presence of a crystal or a plurality of crystals in an otherwise amorphous alloy can be construed as a "crystalline phase" therein. The degree of crystallinity (or "crystallinity" for short in some embodiments) of an alloy can refer to the amount of the crystalline phase present in the alloy. The degree can refer to, for example, a fraction of crystals present in the alloy. The fraction can refer to volume fraction or weight fraction, depending on the context. A measure of how "amorphous" an amorphous alloy is can be amorphicity. Amorphicity can be measured in terms of a degree of crystallinity. For example, in one embodiment, an alloy having a low degree of crystallinity can be said to have a high degree of amorphicity. In one embodiment, for example, an alloy having 60 vol % crystalline phase can have a 40 vol % amorphous phase.

Amorphous Alloy or Amorphous Metal

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." In one embodiment, a bulk metallic glass ("BMG") can refer to an alloy, of which the microstructure is at least partially amorphous. However, there are several ways besides extremely rapid cooling to produce amorphous metals, including physical vapor deposition, solid-state reaction, ion irradiation, melt spinning, and mechanical alloying. Amorphous alloys can be a single class of materials, regardless of how they are prepared.

Amorphous metals can be produced through a variety of quick-cooling methods. For instance, amorphous metals can be produced by sputtering molten metal onto a spinning metal disk. The rapid cooling, on the order of millions of degrees a second, can be too fast for crystals to form, and the material is thus "locked in" a glassy state. Also, amorphous metals/alloys can be produced with critical cooling rates low enough to allow formation of amorphous structures in thick layers—e.g., bulk metallic glasses.

The terms "bulk metallic glass" ("BMG"), bulk amorphous alloys, and bulk solidifying amorphous alloys are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm. Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous metals can be an alloy rather than a pure metal. The alloys may contain atoms of significantly different sizes, leading to low free volume (and therefore having viscosity up to orders of magnitude higher than other metals and alloys) in a molten state. The viscosity prevents the atoms from moving enough to form an ordered lattice. The material structure may result in low shrinkage during cooling and resistance to plastic deformation. The absence of grain boundaries, the weak spots of crystalline materials in some cases, may, for example, lead to better resistance to wear and corrosion. In one embodiment, amorphous metals, while technically glasses, may also be much tougher and less brittle than oxide glasses and ceramics.

Thermal conductivity of amorphous materials may be lower than that of their crystalline counterparts. To achieve formation of an amorphous structure even during slower cooling, the alloy may be made of three or more components, leading to complex crystal units with higher potential energy and lower probability of formation. The formation of amorphous alloy can depend on several factors: the composition of the components of the alloy; the atomic radius of the components (preferably with a significant difference of over 12% to achieve high packing density and low free volume); and the negative heat of mixing the combination of components, inhibiting crystal nucleation and prolonging the time the molten metal stays in a supercooled state. However, as the formation of an amorphous alloy is based on many different variables, it can be difficult to make a prior determination of whether an alloy composition would form an amorphous alloy.

Amorphous alloys, for example, of boron, silicon, phosphorus, and other glass formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which can have none of the defects (such as dislocations) that limit the strength of crystalline alloys. For example, one modern amorphous metal, known as Vitreloy™, has a tensile strength that is almost twice that of high-grade titanium. In some embodiments, metallic glasses at room temperature are not ductile and tend to fail suddenly when loaded in tension, which limits the material applicability in reliability-critical applications, as the impending failure is not evident. Therefore, to overcome this challenge, metal matrix composite materials having a metallic glass matrix containing dendritic particles or fibers of a ductile crystalline metal can be used. Alternatively, a BMG low in element(s) that tend to cause embitterment (e.g., Ni) can be used. For example, a Ni-free BMG can be used to improve the ductility of the BMG.

Another useful property of bulk amorphous alloys is that they can be true glasses; in other words, they can soften and flow upon heating. This can allow for easy processing, such as by injection molding, in much the same way as polymers. As a result, amorphous alloys can be used for making sports equipment, medical devices, electronic components and equipment, and thin films. Thin films of amorphous metals can be deposited as protective coatings via a high velocity oxygen fuel technique.

A material can have an amorphous phase, a crystalline phase, or both. The amorphous and crystalline phases can have the same chemical composition and differ only in the microstructure—i.e., one amorphous and the other crystalline. Microstructure in one embodiment refers to the structure of a material as revealed by a microscope at 25× magnification or higher. Alternatively, the two phases can have different chemical compositions and microstructures. For example, a composition can be partially amorphous, substantially amorphous, or completely amorphous.

As described above, the degree of amorphicity (and conversely the degree of crystallinity) can be measured by fraction of crystals present in the alloy. The degree can refer to volume fraction of weight fraction of the crystalline phase present in the alloy. A partially amorphous composition can refer to a composition of at least about 5 vol % of which is of an amorphous phase, such as at least about 10 vol %, such as at least about 20 vol %, such as at least about 40 vol %, such as at least about 60 vol %, such as at least about 80 vol %, such as at least about 90 vol %. The terms "substantially" and "about" have been defined elsewhere in this application. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

In one embodiment, an amorphous alloy composition can be homogeneous with respect to the amorphous phase. A substance that is uniform in composition is homogeneous. This is in contrast to a substance that is heterogeneous. The term "composition" refers to the chemical composition and/or microstructure in the substance. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air where different ingredients therein are equally suspended, though the particles, gases and liquids in air can be analyzed separately or separated from air.

A composition that is homogeneous with respect to an amorphous alloy can refer to one having an amorphous phase substantially uniformly distributed throughout its microstructure. In other words, the composition macroscopically comprises a substantially uniformly distributed amorphous alloy throughout the composition. In an alternative embodiment, the composition can be of a composite, having an amorphous phase having therein a non-amorphous phase. The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can have a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or different chemical composition. In one embodiment, they have substantially the same chemical composition. In another embodiment, the crystalline phase can be more ductile than the BMG phase.

The methods described herein can be applicable to any type of amorphous alloys. Similarly, the amorphous alloys described herein as a constituent of a composition or article can be of any type. The amorphous alloy can comprise the element Zr, Hf, Ti, Cu, Ni, Pt, Pd, Fe, Mg, Au, La, Ag, Al, Mo, Nb, Be, or combinations thereof. Namely, the alloy can include any combination of these elements in its chemical formula or chemical composition. The elements can be present at different weight or volume percentages. For example, an iron "based" alloy can refer to an alloy having a non-insignificant weight percentage of iron present therein, the weight percent can be, for example, at least about 20 wt %, such as at least about 40 wt %, such as at least about 50 wt %, such as at least about 60 wt %, such as at least about 80 wt %. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, or beryllium, or combinations thereof. In one embodiment, the alloy or the composite is completely free of nickel, aluminum, beryllium, or combinations thereof.

For example, the amorphous alloy can have the formula $(Zr, Ti)_a(Ni, Cu, Fe)_b(Be, Al, Si, B)_c$, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula $(Zr, Ti)_a(Ni, Cu)_b(Be)_c$, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the formula $(Zr, Ti)_b(Ni, Cu)_b(Be)_c$, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the formula $(Zr)_a(Nb, Ti)_b(Ni, Cu)_c(Al)_d$, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One exemplary embodiment of the aforedescribed alloy system is a Zr—Ti—Ni—Cu—Be based amorphous alloy under the trade name Vitreloy™, such as Vitreloy-1 and Vitreloy-101, as fabricated by Liquidmetal Technologies, CA, USA. Some examples of amorphous alloys of the different systems are provided in Table 1.

The amorphous alloys can also be ferrous alloys, such as (Fe, Ni, Co) based alloys. Examples of such compositions are disclosed in U.S. Pat. Nos. 6,325,868; 5,288,344; 5,368,659; 5,618,359; and 5,735,975, Inoue et al., Appl. Phys. Lett., Volume 71, p 464 (1997), Shen et al., Mater. Trans., JIM, Volume 42, p 2136 (2001), and Japanese Patent Application No. 200126277 (Pub. No. 2001303218 A). One exemplary composition is $Fe_{72}Al_5Ga_2P_{11}C_6B_4$. Another example is $Fe_{72}Al_7Zr_{10}Mo_5W_2B_{15}$. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

The aforedescribed amorphous alloy systems can further include additional elements, such as additional transition metal elements, including Nb, Cr, V, Co. The additional elements can be present at less than or equal to about 30 wt %, such as less than or equal to about 20 wt %, such as less than or equal to about 10 wt %, such as less than or equal to about 5 wt %. In one embodiment, the additional, optional element is at least one of cobalt, manganese, zirconium, tantalum, niobium, tungsten, yttrium, titanium, vanadium and hafnium to form carbides and further improve wear and corrosion resistance. Further optional elements may include phosphorous, germanium and arsenic, totaling up to about 2%, and preferably less than 1%, to reduce melting point. Otherwise incidental impurities should be less than about 2% and preferably 0.5%.

In some embodiments, a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the alloy sample/composition consists essentially of the amorphous alloy (with only a small incidental amount of impurities). In another embodiment, the composition consists of the amorphous alloy (with no observable trace of impurities).

TABLE 1

Exemplary amorphous alloy compositions

| Alloy | Atm % | Atm % | Atm % | Atm % | Atm % | Atm % |
|---|---|---|---|---|---|---|
| 1 | Zr 41.20% | Ti 13.80% | Cu 12.50% | Ni 10.00% | Be 22.50% | |
| 2 | Zr 44.00% | Ti 11.00% | Cu 10.00% | Ni 10.00% | Be 25.00% | |
| 3 | Zr 56.25% | Ti 11.25% | Cu 6.88% | Ni 5.63% | Nb 7.50% | Be 12.50% |
| 4 | Zr 64.75% | Ti 5.60% | Cu 14.90% | Ni 11.15% | Al 2.60% | Be 1.00% |
| 5 | Zr 52.50% | Ti 5.00% | Cu 17.90% | Ni 14.60% | Al 10.00% | |
| 6 | Zr 57.00% | Nb 5.00% | Cu 15.40% | Ni 12.60% | Al 10.00% | |
| 7 | Zr 50.75% | Cu 36.23% | Ni 4.03% | Al 9.00% | Sn 0.50% | |
| 8 | Zr 46.75% | Ti 8.25% | Cu 7.50% | Ni 10.00% | Be 27.50% | |
| 9 | Zr 21.67% | Ti 43.33% | Ni 7.50% | Be 27.50% | | |
| 10 | Zr 35.00% | Ti 30.00% | Cu 7.50% | Be 27.50% | | |
| 11 | Zr 35.00% | Ti 30.00% | Co 6.00% | Be 29.00% | | |
| 12 | Au 49.00% | Ag 5.50% | Pd 2.30% | Cu 26.90% | Si 16.30% | |
| 13 | Au 50.90% | Ag 3.00% | Pd 2.30% | Cu 27.80% | Si 16.00% | |
| 14 | Pt 57.50% | Cu 14.70% | Ni 5.30% | P 22.50% | | |
| 15 | Zr 36.60% | Ti 31.40% | Nb 7.00% | Cu 5.90% | Be 19.10% | |
| 16 | Zr 38.30% | Ti 32.90% | Nb 7.30% | Cu 6.20% | Be 15.30% | |
| 17 | Zr 39.60% | Ti 33.90% | Nb 7.60% | Cu 6.40% | Be 12.50% | |
| 18 | Cu 47.00% | Ti 34.00% | Zr 11.00% | Ni 8.00% | | |
| 19 | Zr 55.00% | Co 25.00% | Al 20.00% | | | |

Melting Instrument

One embodiment described herein provides an article or instrument used for alloying elements and/or melting metal alloys. In one embodiment, the article can be a container, which in one embodiment can be in the form of a crucible or crucible assembly. The article described herein can also be used for molding and casting metal alloys.

The term "alloying" in one embodiment refers to the process of heating up predetermined amounts of a plurality of individual "raw" elements (e.g., metal elements or non-metal elements) to melt and mix them together to form at least one alloy. For example, each of these elements can be in the form of a powder, bar, ingot, etc. In some instances, a master alloy that comprises an at least partially amorphous alloy can also be used to be alloyed with additional elements. This process in some embodiments described herein can involve stacking the elements/master alloys in a specific configuration to cause the element(s) in the mixture with the lowest melting point to soften, melt, wet, and/or fuse with the other elements, thereby allowing the mixture to collapse, mix, and/or ultimately become homogenous. Once the individual constituents become mostly molten and mixed with each other, the melt usually can be overheated by some certain predetermined degree to ensure a completely molten, homogeneous alloy product (e.g., alloy feedstock). The constituents to be heated and/or mixed (i.e., the alloy elements, or alloying elements) are sometimes referred to as an "alloy charge."

The term "melting" in one embodiment can include the steps described above, but can also more generally be used to describe the process of taking an already homogenous (or relatively homogeneous) piece of alloy feedstock (either amorphous or crystalline, or of any degree of crystallinity in between), heating it up above its melting point, and further processing it. In other words, compared to alloying, "melting" herein can refer to the process of alloying (as the elements can alloy while in a molten state) and additionally to the process of taking a homogenous alloy feedstock and heating it up to render it molten before processing. The container used during alloying and/or melting is referred to as a "crucible" in some embodiments.

The term "molding" in one embodiment described herein can be used interchangeably with "thermoplastic forming" and "hot forming." Specifically, the term herein can refer to a process of heating an alloy feedstock to above the glass transition temperature Tg but below the melting temperature Tm and then forming a shape from it. As provided previously, the term "feedstock" used herein can be partially amorphous, substantially amorphous, or fully amorphous. In other words, a molding process in some instances would be subsequent to a melting/alloying process, as the former is shaping/forming the product of the latter.

The term "casting" in one embodiment herein can refer to a process of heating an alloy feedstock to above the melting point of the alloy and subsequently forming a shape from the molten feedstock. Sometimes the terms "casting" and "molding" can be used interchangeably. For instance, in the case of "injection molding," the process of molding can be analogous with that of casting. The container used during alloying and/or melting is referred to as a "mold" in some embodiments.

A crucible can differ from a mold in several aspects. A "crucible" can refer to a container with a cavity, the container comprising a refractory material used for metal, glass, and pigment production, as well as a number of modern laboratory processes, which can withstand temperatures high enough to melt or otherwise alter its contents. The geometry of the cavity of a crucible usually has minimal effect on the geometry of the final metal/alloy product, as the product is often subsequently molded into the desired shape in a separate molding process. By contrast, a "mold" can refer to a hollowed-out block that is filled with a liquid like plastic, glass, metal, or ceramic raw materials. The liquid hardens or sets inside the mold, adopting its shape. In other words, the geometry of the cavity of a mold can have a significant role in that of the final metal/alloy product, as the latter conforms to the former. Thus, the design of the geometry of the cavity of a mold can be important. Also, while it need not be true in all cases, because alloying/melting processes generally need to be operated at a temperature greater than Tm of the alloy charge, while that of a molding does not, a crucible generally needs to be able to sustain heating and its impact (e.g., attack, contamination, as described below) much more than a mold.

The articles described herein can comprise an inner container having a cavity, the inner container comprising a ceramic; and an outer container, the outer container comprising a susceptor; wherein at least a portion of an outer surface of the inner container is in contact with an inner surface of the outer container, and wherein the inner container is removable from the mold. In one embodiment, the article can be a crucible, or a part of a crucible assembly. For example, the inner container can be a crucible, which can be located in a cavity of an outer container, as shown in FIG. 1.

The inner container can comprise a ceramic, consist essentially of a ceramic, or consist of a ceramic. The ceramic can comprise at least one element selected from Groups IVA, VA, and VIA in the Periodic Table. Specifically, the element can be at least one of Ti, Zr, Hf, Th, Va, Nb, Ta, Pa, Cr, Mo, W, and U. In one embodiment, the ceramic can comprise an oxide, nitride, oxynitride, boride, carbide, carbonitride, silicate, titanate, silicide, or combinations thereof. For example, the ceramic can comprise yttria, silicon nitride, silicon oxynitride, silicon carbide, boron carbonitride, titanium boride ($TiB_2$), zirconium silicate (or "zircon"), aluminum titanate, boron nitride, alumina, zirconia, magnesia, silica, tungsten carbide, aluminum oxynitride (or "sialon"), or combinations thereof. The inner container can comprise a material insensitive to radio frequency (RF) as in that used in induction heating. One such RF-insensitive material is yttria. Alternatively, a material sensitive to RF can be used.

In another embodiment, the inner container can comprise a refractory material. A refractory material can comprise refractory metals, such as molybdenum, tungsten, tantalum, niobium, rehenium, etc. Alternatively, the refractory material can comprise a refractory ceramic. The ceramic can be any of the aforementioned ceramics, including yttria, silicon nitride, silicon carbide, boron nitride, boron carbide, aluminum nitride, alumina, zirconia, titanium diboride, zirconium silicate, aluminum silicate, aluminum titanate, tungsten carbide, silica, and fused silica.

The outer container can comprise a susceptor. A "susceptor" herein can refer to a material used for its ability to absorb electromagnetic energy and convert it to heat, which can sometimes be designed to be re-emitted as infrared thermal radiation. This energy can be radio frequency or microwave radiation used in industrial heating processes and also occasionally in microwave cooking. Any commonly known susceptor can be used. For example, the susceptor can comprise graphite, a refractory material, or both. A refractory material is described above. Alternatively, the susceptor can comprise silicon carbide, stainless steel, and/or any other electrically conductive materials.

In one embodiment, the outer container can comprise a material that is more thermally conductive than the material(s) of the inner container. Thus, the outer container can be more thermally conductive than the inner container. The outer container can comprise a material sensitive to RF during induction heating. Alternatively, a material insensitive to RF can be used.

The outer container is connected to a heat source. The heat source can be any suitable heat source. For example, the heat source can be an inductive heating coil surrounding at least a portion of the outer container, as shown in FIG. 1. The inner container 11 is inside the cavity of the outer container 12. In this embodiment, the inner container 11 can be a crucible comprising a ceramic. The crucible can be any commercially available crucibles known in the art that is suitable for alloying and/or melting. At least a portion of the inner container 11 is in contact with the outer container 12. Note that FIG. 1 is merely a schematic, and alternative versions of the design can exist. For example, the height of 11 can be taller than that of 12 (as shown), but it can also be shorter or of equal height. The thickness of the wall of the inner container 11 can be the same as, larger, or smaller than that of outer container 12. The inner and outer containers can have any desirable geometry. For example, it can be cylindrical, spherical, cubic, rectangular, or an irregular shape.

The outer container and inner container can be in contact with each other in various ways. For example, in one embodiment substantially the entire outer surface of the inner container is in contact with the inner surface of the outer container. In one instance, the inner container can fit intimately within the cavity of the outer container, as shown in the schematic provided in FIG. 1. Depending on the geometry, there can be gap between the inner and the outer containers (as shown in the bottom of the inner container in FIG. 1); alternatively, the geometries of the two containers can be such that there is no gap. Accordingly, the inner and outer containers can be in contact with all of the walls of the inner container (as shown in FIG. 1). Alternatively, only a certain wall (e.g., bottom wall) of the inner container is in contact with the outer container.

The inner container can be removed from the outer container and reinserted. In one embodiment, the removable inner container can be reusable. For example, the inner container can be a mold and upon ejecting the molded metal/alloy part inside the mold, the mold can be reinserted into the outer container for the subsequent molding process. The reusability can also be applied to the incident where the inner container is used for alloying, melting, or casting. As will be shown below, the presently provided inner containers surprisingly exhibit poor wetting of the alloys in contact therewith, thereby minimizing the risk of contamination of the inner surface of the inner container by the metal alloy, and vice versa. As a result, the inner crucible can be reused.

The article in the presently described configuration can be used as a crucible (or crucible assembly) with surprising advantages. For example, the articles can allow the use of a crucible comprising a thermal shock-sensitive material, such as yttria or sialon, without a loss of the integrity of the crucible during or after heating. In one embodiment, the inner container can be a crucible that comprises a RF-insensitive material. The wall of the inner container can also serve as a liner to the wall of the outer container, which can comprise a susceptor. Thus, instead of the amorphous alloy constituents in the cavity of the inner container, the RF-insensitive material can catch the RF radiation.

One alternative embodiment provides a crucible assembly, comprising: an inner layer comprising a ceramic; and an outer layer comprising a susceptor, which can comprise carbon (such as in the form of graphite). In one embodiment, at least a portion of an outer surface of the inner layer is in contact with an inner surface of the outer layer.

The ceramic of the inner layer can be in any shape or size. The inner layer can serve as a liner for a susceptor, instead of being a stand-alone crucible. The inner layer can, for example, be a hollow cylinder made of sheet or sheets of ceramic. Alternatively, it can have the form of a plurality of particulates, such as sprayed particulates. The particulates can be sprayed by any known spraying techniques. The particulates can be in the form of particles, which can be of any shape and size, such as spherical, rod-like, flake-like, or any irregular shape. The ceramic can be any of the aforementioned ceramic, such as yttria, silicon nitride, silicon oxynitride, silicon carbide, boron carbonitride, titanium boride, zirconium silicate, aluminum titanate, boron nitride, alumina, zirconia, magnesia, silica, tungsten carbide, or combinations thereof. On the other hand, the outer layer can comprise any of the materials that can be used in the aforedescribed outer container.

Melting Process

As described above, the presently described articles can be used in a melting and/or an alloying process. A melting process in one embodiment can include providing a mixture of alloy elements (or alloy charge) to be alloyed; and heating the mixture in a crucible to a temperature above a melting temperature of the alloy elements. The alloy in one embodiment refers to an alloy that is at least partially amorphous, although the alloy in some instances can also refer to crystalline alloys. In one embodiment, the alloy is a BMG. The crucible can be any suitable crucibles, such as that in any of the articles described herein. Specifically, the crucible can be inside the cavity of an outer container. While the crucible can be used for a molding process, it is preferable in some of the embodiments provided herein that the crucible be used for melting or molding.

Figure 2:
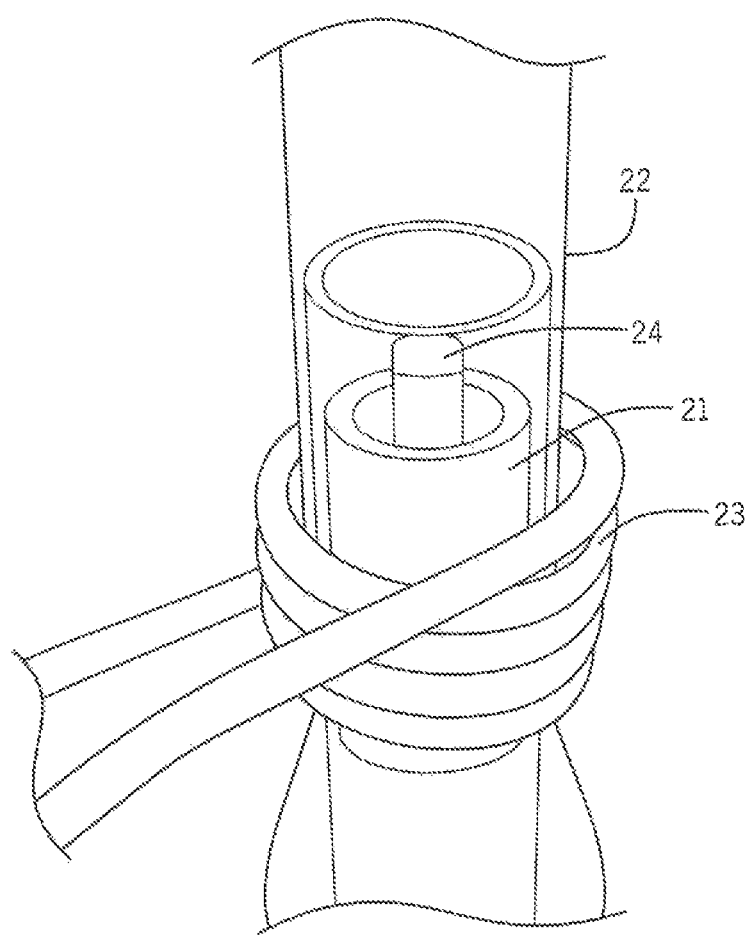
FIG. 2 provides a photograph of an experimental setup for testing the compatibility of sialon with Zr-based amorphous alloys. The crucible 21 is placed inside a quartz enclosure 22, which is evacuated to less than 0.005 torr, and an induction coil 23 is placed around the exterior of the evacuated quartz enclosure, sialon crucible, and the alloy ingot 24 within the crucible.
Figure 3:
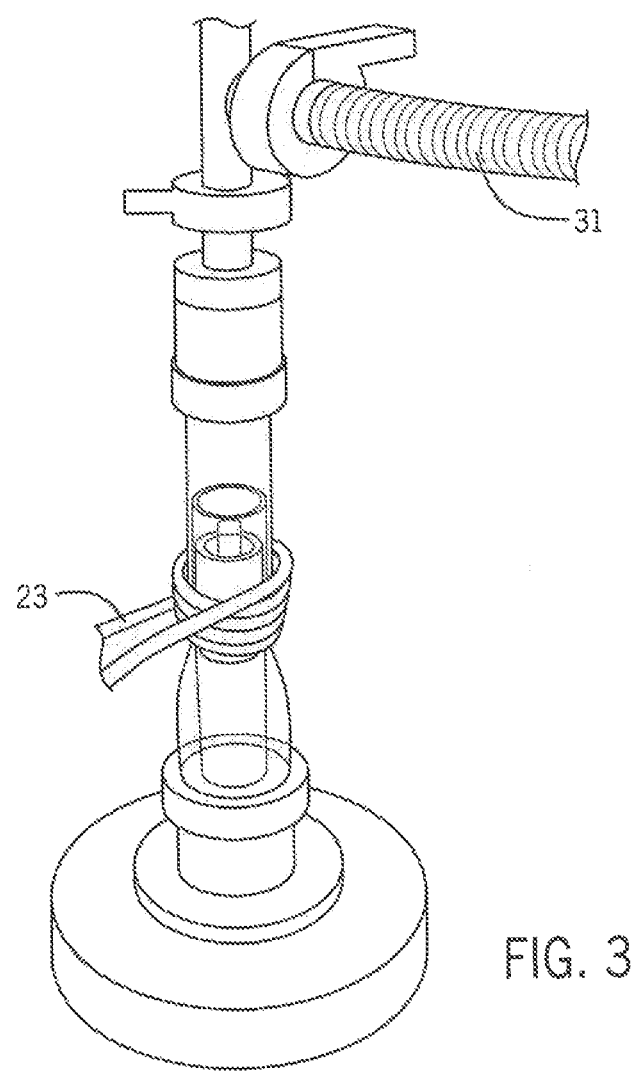
FIG. 3 provides an alternative view of the setup shown in FIG. 2. The hose 31 at the top is connected to a vacuum pump, and the coil 23 is connected to a radio frequency (RF) power supply (not shown).

In one melting embodiment, the mixture can comprise a plurality of individual alloy elements, or at least one master alloy, that are used to create a final alloy composition that can be arrayed inside the inner container, and they can be heated to a high enough temperature such that they fuse and dissolve into one another, forming the molten alloy. The setup can be, for example, as shown in FIGS. 2 and 3. At least a part of the heating, such as the entire heating process, can be conducted by any of the heating techniques described above, such as inductive heating, such as one inductive heating carried out by RF frequency. The heating can be carried out in under a partial vacuum, such as low vacuum, or even high vacuum, to avoid reaction of the alloy with air. In one embodiment, the vacuum environment can be at about $10^{-2}$ torr or less, such as at about $10^{-3}$ torr or less, such as at about $10^{-4}$ torr or less. Alternatively, the step of heating and/or disposing can be carried out in an inert atmosphere, such as in argon, nitrogen, helium, or mixtures thereof. Non-inert gas, such as ambient air, can also be used, if they are suitable for the application. In another embodiment, it can be carried in a combination of a partial vacuum and an inert atmosphere. In one embodiment, the heating can be conducted by vacuum induction melting. The heating can also be carried out in an inert atmosphere, such as one with argon, The alloy elements can comprise metallic elements, non-metallic elements, or both. The elements can be elements of any of the alloys described above. Also, once the elements become dissolved together, the alloy can be held at some temperature at or above its liquidus temperature—i.e., the temperature at which it is at least substantially molten, such as completely molten, for a period of time. The length of the period can depend on the chemistry of the alloy. As a result, via the presently provided crucibles, the elements and/or master alloys can be transformed into a homogenous alloy or an alloy feedstock. Additional processing, including cooling, such as quenching, the molten alloyed elements to a solid feedstock can be applied. The feedstock can subsequently be molded into a desirable, predetermined geometry in a molding process.

The mixture can comprise Zr, Fe, Hf, Cu, Co, Ni, Al, Sn, Be, Ti, Pt, Cu, Ni, P, Si, B, Pd, Ag, Ge, Ti, V, Nb, Zr, Be, Fe, C, B, P, Mn, Mo, Cr, Y, Si, Y, Sc, Pb, Mg, Ca, Zn, La, W, Ru, or combinations thereof. Any other elements that can be used to form any of the aforementioned alloys can also be used. For example, the alloy can be an amorphous alloy, such as a BMG. In particular, the alloy can be a precious metal-based amorphous alloy, comprising Pt, Cu, Ni, P, Si, B, Pd, Ag, Ge, or combinations thereof. The alloy can be a dendritic amorphous alloy, comprising Ti, V, Nb, Zr, Be, or combinations thereof. Alternatively, the alloy can be a Fe-based amorphous alloy, comprising Fe, C, B, P, Mn, Mo, Cr, Y, or combinations thereof. The alloy can also be any of the amorphous alloys containing small additions of Si, Y, Sc, and/or Pb. The alloy can also be one amorphous alloy containing Mg, Ca, Zn, La, W, Ru, or combinations thereof.

As described above, it is desirable to have the inner container comprise a material that can have minimal wetting between the wall of the inner container and the alloy feedstock resultant from the heating process (or during the process). For example, the inner container can comprise yttria, sialon, or any of the materials mentioned above as candidates for the inner container. The term "wetting" is readily understood in the art. In some embodiments, the lack of wetting can refer to a lack of significant amount of the alloy observed on the inner wall of the inner container after the molten alloy is quenched into a solid. The presence of alloy element(s) on the wall can be due to physical interaction/reaction (e.g., adsorption) between the alloy and the inner container or chemical interaction/reaction (e.g., chemical reaction). In one embodiment, a lack of wetting can refer to the inner wall of the inner container as substantially free of the alloy thereon, save some trace amount. The presently described articles also can minimize inter-diffusion and/or contamination between the elements from the alloy and those of the inner container and/or the crucible assembly as a whole, including the outer container. For example, the molten, heated alloy charge, and the resultant solid alloy feedstock can be at least substantially free of the elements diffused from the inner container, the outer container, or both. For example, in the instance where the outer layer (or container) comprises a graphite susceptor, the alloy can be substantially free of the carbon from the graphite susceptor.

The lack of wetting can also be reflected in a lack of reaction (chemical or physical) between the elements of the molten alloy and those of the inner container (or even outer container in some cases). In one embodiment, the presently provided articles can substantially prevent the molten alloy charge or individual elements inside the inner container from reacting with the inner container at the interface between the two. Such a reaction is also sometimes referred to as "attack" on the wall of the crucible, or, alternatively, "contamination" of the alloy charge.

The reaction can refer to various types of reactions. For example, it can refer to dissolution of the elements of the inner container into the molten alloy, causing contamination of the molten alloy by the constituent elements of the container. Dissolution can involve the breakdown of the crystals that make up the inner container and the diffusion of those elements into the molten alloy. It can also refer to diffusion of the molten alloy into the inner container. Diffusion can involve diffusive transport of the elements of the alloy (charge) into the grains (or crystals) and/or grain boundaries in the container. In some cases it can also refer to the production of crystalline phases, which contain elements from both the molten alloy and the inner container at the interface between the two. These crystalline phases can be oxides, nitrides, carbides, etc., or they can be intermetallics. They may also be transported from the interface into the bulk of the molten alloy by stirring, causing further contamination.

In one embodiment, the "attack" (or "contamination") may be quantified by either measuring the concentration of impurity elements in the final melted alloy (indicating the degree to which the elements comprising the inner container have entered the alloy) or by the deviation of the main elements of the final melted alloy from the desired nominal composition (indicating diffusion of alloy elements into the inner container). This can involve measurement of the alloy composition and comparison with the nominal composition in terms of both the main constituents and also impurity elements, such as oxygen, carbon, nitrogen, sulfur, hydrogen, and the elements of the inner container. The tolerance for impurity elements depends on the actual alloy composition being melted. Moreover, one additional measure of "attack" could also be the thickness of the inner container wall after processing, indicating whether substantial amounts of the container material have dissolved into the molten alloy.

Because the inner container can be removable from the crucible, the inner container can be removed, cleaned (or subjected to any post-production processing), and reinserted into the cavity of the outer container in the crucible. Alternatively, a new, replacement inner container can be inserted into the cavity of the outer container.

In one embodiment, the inner crucible container can be pre-treated. For example, the inside of a crucible, such as one comprising graphite, can be pre-treated with a coating of Zr or Si powder, or Zr- or Si-containing compounds that react with carbon. The crucible can then be heated under vacuum to force the powder to react with the crucible, forming zirconium or silicon carbide. The pre-treated crucible can be used to melt alloy feedstock, minimizing carbon addition to alloy from the graphite. In addition to using a silicon carbide directly as the ceramic in the inner container, this pre-treatment method can be an alternative technique to produce a ceramic crucible with improved thermal shock.

Thermal Shock Resistance Improvement

As aforedescribed, when used as a melting instrument, the presently described articles can have improved thermal shock resistance relative to the pre-existing crucibles. In particular, in one embodiment, with the combination of the outer container and the inner container (i.e., crucible), the presently described crucible has an improved thermal shock resistance with respect to crack initiation relative to a crucible without the outer container. The measurement of thermal shock resistance can be readily understood by one of ordinary skill in the art. For example, in the case of ceramics, measuring thermal shock resistance usually involves heating a solid piece slowly to various high temperatures, then quenching it in a cold medium, such as water—the ASTM C1525 standard provides some guidance regarding the measurement. In one embodiment, the maximum temperature interval through which it can be quenched without substantially reducing the retained flexural strength by induced cracks can represent the thermal shock resistance.

The thermal shock resistance of a material, or an assembly of different materials, can be improved by various techniques. For example, the improvement can be accomplished by using a material with higher thermal conductivity; a material with lower thermal expansion coefficient; a material with higher strength or lower elastic modulus; a material with higher toughness; or resistance to cracking; or it can be improved by heating the material more slowly in order to reduce thermal gradients within the material itself. The improvement can also be accomplished by any combination of these techniques, or any other commonly known techniques.

In one embodiment, the presently described crucible assembly can improve the thermal shock resistance by heating the material more slowly in order to reduce thermal gradients within the material itself. Specifically, by using a susceptor on the outside, the inner container can comprise a material with low thermal shock resistance and/or fracture toughness. The susceptor can heat the inner container uniformly and will also allow the inner container and the alloy charge inside to be heated in a slow and more controlled manner, both of which will help reduce thermal gradients in the inner container, preventing failure due to thermal shock.

Figure 6:
FIG. 6 provides a photograph showing that the top part of the crucible fractured after the alloy rapidly heated, melted, and filled the crucible in one embodiment. The alloy was allowed to cool slowly, and it was retained within the cracked crucible. Wetting between the alloy and crucible wall was poor, and it was fairly easy to remove the crucible fragments, indicating good compatibility for processing.
Figure 7:
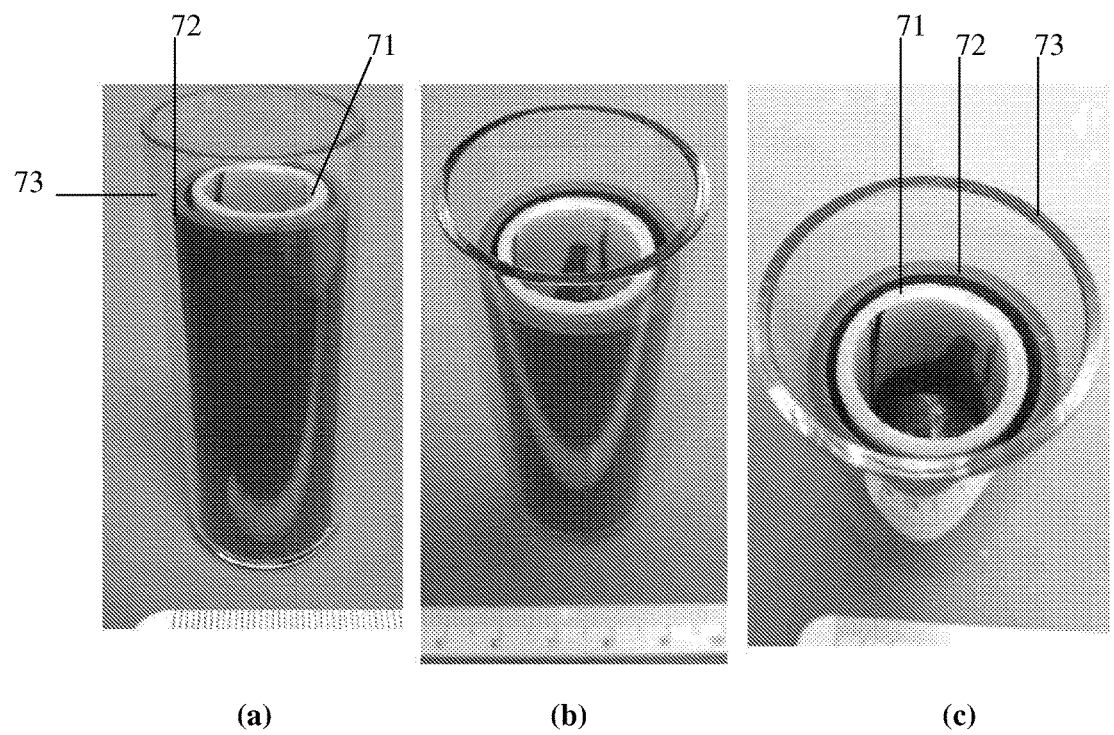
FIGS. 7(a)-(c) provide different views of an yttria crucible inserted into a graphite susceptor, both of which are held within a quartz container for processing in one embodiment. The figures, particularly

As a result, the presently described articles can effectively prevent cracks into and/or through the wall of the inner container. In one instance, for example, there are no observable cracks into and/or through the wall of the inner container in the presently described articles. For example, pre-existing melting techniques often involve using an yttria crucible alone. However, as soon as the alloy charge heats inductively and collapses into the crucible, the latter cracks immediately due to the shock of the molten alloy at greater than about 1000° C. hitting a relatively cool crucible—the crucible is not electrically conductive, and thus does not heat due to induction. FIG. 6 demonstrates the fracture of the crucible due to thermal shock after heating. By contrast, as provided in the presently described articles, if the exterior of the crucible is heated via a susceptor, it will be warmed close to the melting temperature of the alloy inside before the alloy collapses, and thus the thermal gradient will be substantially reduced, as shown in FIG. 7(c) in one embodiment.

Because of the high thermal shock resistance as a result of the presently described setup, the inner container (or crucible) substantially does not develop observable cracks after the crucible is heated for a period of time at a high temperature, such as at least about 1000° C., such as at least about 1100° C., such as at least about 1200° C., such as at least about 1300° C., such as at least about 1400° C., such as at least about 1500° C. The length of the period can depend on the temperature, and it can range from minutes to hours. For example, it can be at least about 5 minutes, such as at least about 10 minutes, such as at least about 20 minutes, such as at least about 40 minutes, such as at least about 1 hour, such as at least about 2 hours, such as at least about 4 hours, such as at least about 6 hours, such as at least about 8 hours, such as at least about 10 hours, such as at least about 12 hours. In one embodiment, when the temperature is 1200° C., substantially no observable cracks are observed for at least 8 hours. In another embodiment, when the temperature is at least about 1300° C., such as at least about 1400° C., substantially no observable cracks are observed for between about 5 minutes and about 60 minutes.

Electronic Device

The aforedescribed crucible can be used in the fabrication process involving BMG. Because of the superior properties of BMG, BMG can be made into structural components in a variety of devices and parts. One such type of device is an electronic device.

An electronic device herein can refer to any electronic device known in the art. For example, it can be a telephone, such as a cell phone, and a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPad™), and a computer monitor. It can also be an entertainment device, including a portable DVD player, conventional DVD player, Blue-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard drive tower housing or casing, laptop housing, laptop keyboard, laptop track pad, desktop keyboard, mouse, and speaker. The article can also be applied to a device such as a watch or a clock.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

NON-LIMITING WORKING EXAMPLES

A series of experiments were performed to test the level of contamination in various crucible materials:

Yttria:

It was found that the ceramic appears to wet LM1 weakly, and chemical analysis showed acceptable (low) levels of contaminants even after 1 hour at a substantial overheat. It was also found that without an outer container containing a susceptor, yttria had very poor thermal shock resistance, and the crucible cracked as soon as molten alloy collapsed into it.

An alternative yttria crucible embodiment was tested. Yttria was spray-coated onto the inside of graphite crucibles for the melting of Hf-based amorphous alloys. The yttria coating was baked for 8 hours at 1200° C. prior to introducing the alloy. After the melting process, it was unexpected that the alloy did not appear to wet and attack the graphite.

Sialon:

A variant of silicon nitride, sialon is a ceramic that has much better thermal shock resistance and toughness in general. The results showed that sialon was able to resist wetting and attack by most of the molten alloys that were in contact with it during the experiment. The nitrogen level was found to increase only slightly, and it was determined that sialon was a desirable material for Zr-based alloy processing.

Silicon Carbide:

This was used as a porous filter material in order to reduce the amount of dross in the feedstock. Multiple casts of various alloys with SiC have been made, and in general it has been observed that Zr-based alloys wet this material very weakly or not at all. It was determined that silicon carbide would be a good candidate for alloy melting to reduce contamination. In order to reduce thermal shock, it was proposed that the silicon carbide crucible be placed inside a graphite susceptor as described above.

FIG. 2 provides a photograph of an experimental setup for testing the compatibility of sialon with a Zr-based amorphous alloy. The crucible 21 was placed inside a quartz enclosure 22 which was evacuated to less than 0.005 torr, and an induction coil 23 was placed around the exterior of the evacuated quartz enclosure, sialon crucible, and the alloy ingot within the crucible. The hose 31 at the top is connected to a vacuum pump, and the coil 23 is connected to a RF power supply, as shown in FIG. 3.

Figure 4:
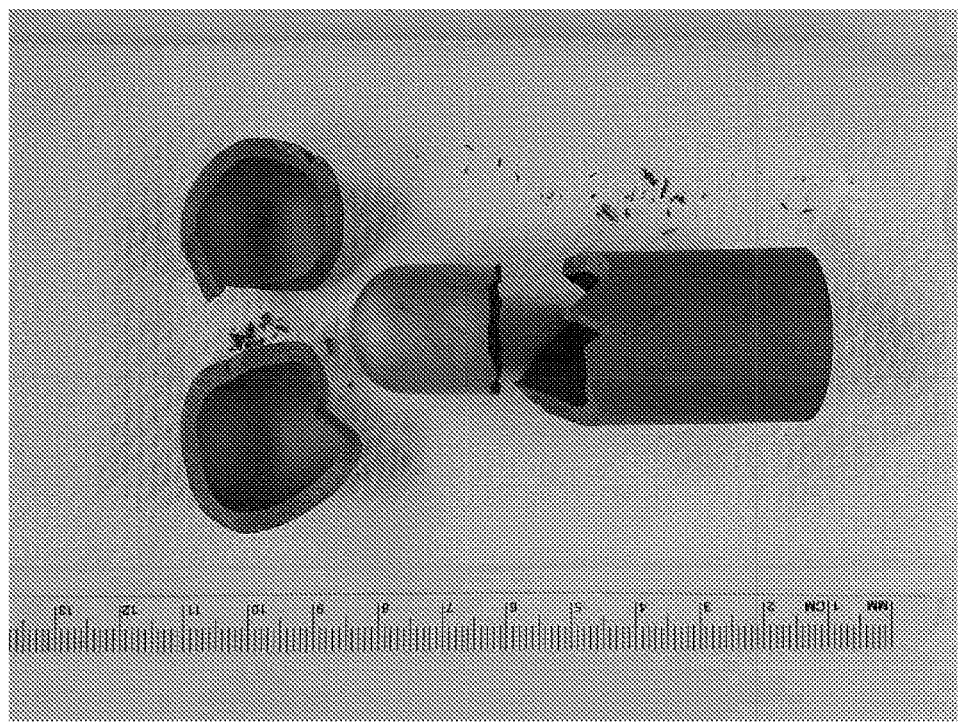
FIGS. 4(a)-4(b) provide photographs showing that in one embodiment an alloy ingot was melted inductively for approximately 30 minutes at 1000° C. inside the sialon crucible, the alloy was allowed to cool to room temperature. The crucible was then intentionally fractured to assess whether the alloy wetted and bonded to the sialon. The alloy was found to fall out of the sialon completely, leaving no residue in the former crucible, indicating very poor wetting and thus good compatibility for alloy processing.
Figure 4:
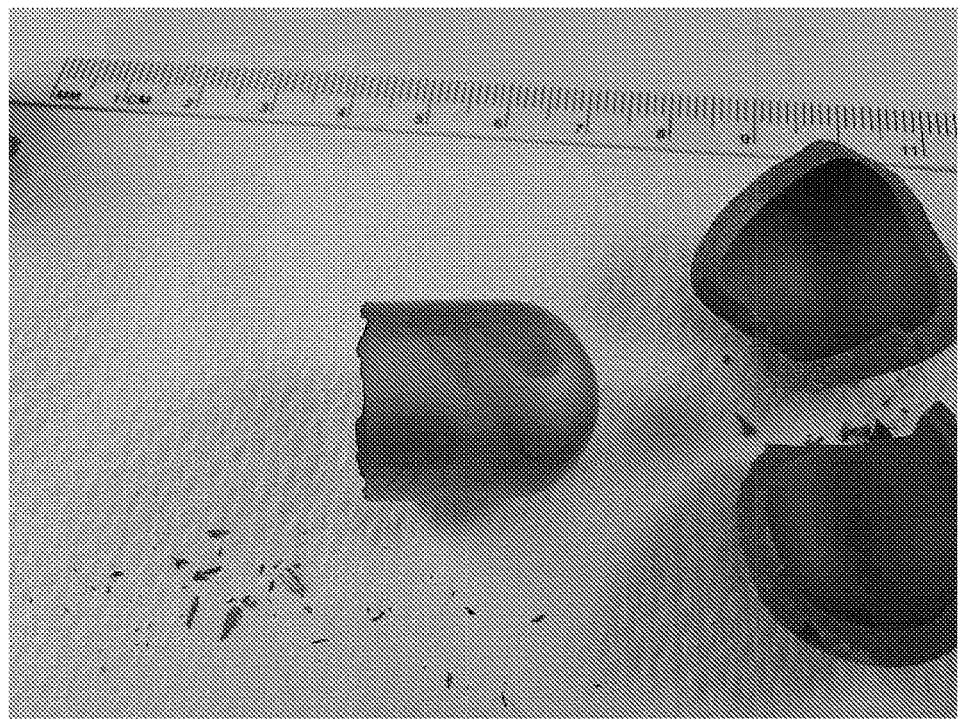
Figure 5:
FIG. 5 provides a photograph showing that lots of copper evaporated from the alloy in 30 minutes, and the same copper deposition was observed when lining the boat with a sialon sleeve.

FIGS. 4(a)-4(b) provide photographs showing that the ingot was melted inductively for approximately 30 minutes at 1000° C. inside the sialon, and the alloy was allowed to cool to room temperature. The crucible was then intentionally fractured to assess whether the alloy wetted and bonded to the sialon. The alloy in fact fell out of the sialon completely, leaving no residue in the former crucible. This indicates very poor wetting and thus good compatibility for alloy processing. FIG. 5 provides a photograph showing that lots of copper evaporated from the alloy in 30 minutes, and the same copper deposition was observed when lining the boat with a sialon sleeve.

Yttria Crucible with a zirconium based alloy heated for 1 hr at 1000° C., and then slow-cooled. FIG. 6 provides a photograph showing that the top part of the crucible fractured after the alloy rapidly heated, melted, and filled the crucible. The alloy was allowed to cool slowly, and it was retained within the cracked crucible. However, the wetting between the alloy and crucible was poor, and it was fairly easy to remove the crucible fragments, indicating good compatibility for processing.

The contamination was low as shown by the chemical analysis, the results of which are provided in Table 2. Yttria appears to increase O content slightly, compared to graphite. The results demonstrate that the ceramic crucibles tested have the potential to have low wetting by the alloy charge. Thus, by introducing an outer container of c susceptor, the overall crucible assembly would have the benefit of a low wetting and also that of an improved thermal shock resistance.

TABLE 2

Chemical analysis results showing the different contamination levels of different crucible designs.

| | Zr (wt %) | Ti (wt %) | Cu (wt %) | Ni (wt %) | Be (wt %) | Y (ppm) | O (ppm) | C (ppm) |
|---|---|---|---|---|---|---|---|---|
| LM1 | 62.60 | 11.01 | 13.23 | 9.78 | 3.38 | | | |
| LM1: Graphite 1 hr @ 1000° C. | 61.72 | 11.00 | 13.57 | 10.28 | 3.44 | | 160 | 210 |
| LM1: yttria 1 hr @ 1000° C. | 62.19 | 11.07 | 13.38 | 9.95 | 3.38 | 360 | 230 | 70 |
| LM1: yttria-coated graphite 1 hr@ 1000° C. | 62.37 | 11.02 | 13.32 | 9.89 | 3.35 | 440 | 260 | 120 |

For comparison, the following experiment was conducted with a yttria crucible 71 inside a graphite susceptor 72, both of which were held inside a quartz container 73, as shown in FIGS. 7(a)-7(c).

The alloy ingot placed inside the yttria crucible was a Zr—Ti—Cu—Ni—Be based alloy (LM1), the composition of which is shown in Table 2. The susceptor was heated inductively to melt the alloy ingot, which collapsed into the yttria crucible. The alloy was held at approximately 1000° C. for 1 hour, and subsequently allowed to slowly cool back to room temperature. It was observed that as the alloy melted and filled the crucible, the yttria crucible was heated uniformly by radiation from the graphite susceptor and that no crack (due to thermal shock) was observed in the crucible. See FIGS. 7(b)-7(c).

What is claimed:

1. A system, comprising:
    an outer container comprising a susceptor and defining an interior surface;
    a removable inner container at least partially in contact with the inner surface of the outer container, the inner container consisting essentially of yttria and defining a cavity configured to receive a metal alloy to be melted therein; and
    an induction coil configured to heat the outer container such that heat radiated from the outer container heats the inner container in a first region in contact with the metal alloy prior to melting and a second region that is not in contact with the metal alloy until after the metal alloy is melted.

2. The system of claim 1, wherein the susceptor comprises graphite, a refractory material, silicon carbide, or combinations thereof.

3. The system of claim 1, wherein the outer container is connected to a heat source.

4. The system of claim 1, wherein substantially the entire outer surface of the inner container is in contact with the inner surface of the outer container.

5. The system of claim 1, wherein the removable inner container is reusable.

6. The system of claim 1, wherein the inner container comprises a layer of yttria particles sprayed on the interior surface of the outer container.

7. The system of claim 1, further comprising a quartz container at least partially surrounding the outer container and the inner container.

8. The system of claim 7, further comprising a vacuum pump coupled to the quartz container and configured to apply an at least partial vacuum to the quartz container.

9. A crucible assembly, comprising:
    a crucible, comprising:
        a removable yttria inner layer configured to receive a metal alloy to be melted therein; and
        an outer layer comprising carbon and configured to be heated by an induction coil such that heat from the outer layer heats the yttria inner layer in a region that is not in contact with the metal alloy until after the metal alloy is melted;
    a quartz container at least partially surrounding the crucible and configured to be positioned inside the induction coil; and
    a vacuum pump coupled to the quartz container and configured to apply an at least partial vacuum to the quartz container, wherein
    at least a portion of the yttria inner layer is in contact with an inner surface of the outer layer.

10. The crucible assembly of claim 9, wherein outer layer comprises graphite.

11. The crucible assembly of claim 9, wherein the inner layer is a part of a crucible.

12. The crucible assembly of claim 9, wherein the yttria inner layer comprises sprayed yttria particles.

* * * * *